United States Patent [19]
Tiedemann

[11] 3,891,551
[45] June 24, 1975

[54] METHOD OF CLEANING A LIQUID FILTER, AND FILTER FOR PERFORMING THE METHOD

[75] Inventor: Wolfgang Otto Tiedemann, Sigtuna, Sweden

[73] Assignee: Sibtec, AB, Stockholm, Sweden

[22] Filed: Sept. 14, 1973

[21] Appl. No.: 397,304

[52] U.S. Cl. ............... 210/82; 210/193; 210/323; 210/333; 210/410
[51] Int. Cl. .................................... B01d 23/24
[58] Field of Search ............ 210/82, 323, 333, 410, 210/412, 193

[56] References Cited
UNITED STATES PATENTS

| | | | |
|---|---|---|---|
| 2,468,603 | 4/1949 | Pew | 210/410 |
| 3,744,633 | 7/1973 | Schmidt, Jr. et al. | 210/82 |

*Primary Examiner*—Frank A. Spear, Jr.
*Assistant Examiner*—Ferris H. Lander
*Attorney, Agent, or Firm*—Burns, Doane, Swecker & Mathis

[57] ABSTRACT

In cleaning a liquid filter compressed air is temporarily introduced into the filter container, producing a first shock which detaches the filter deposits from the filter elements. Immediately afterwards the compressed air is released from the filter container, producing a second shock which breaks up the detached filter deposits.

12 Claims, 1 Drawing Figure

3,891,551
PATENTED JUN 24 1975
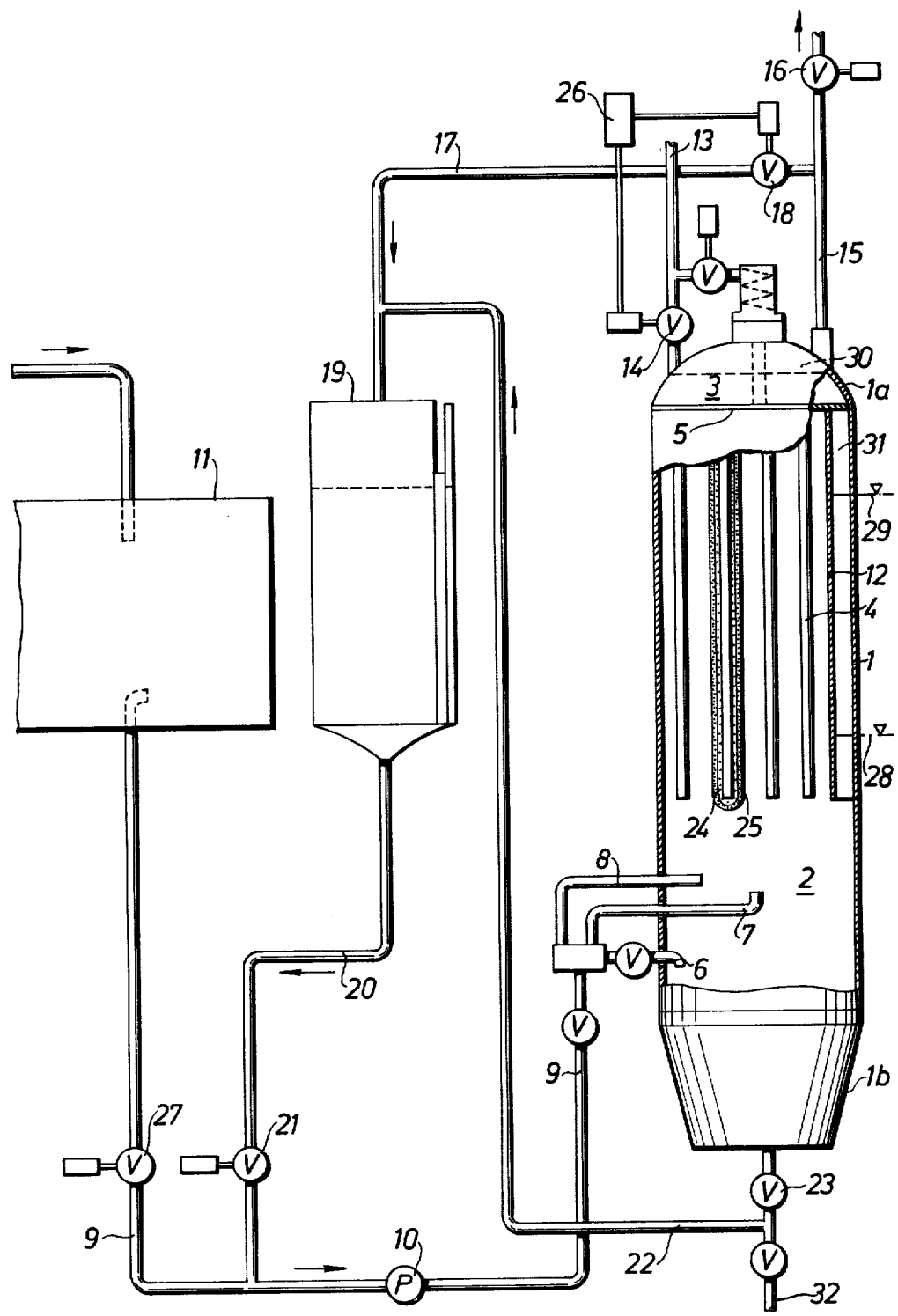

METHOD OF CLEANING A LIQUID FILTER, AND FILTER FOR PERFORMING THE METHOD

The invention relates to a method for cleaning a liquid filter of the type comprising a container, a partition dividing the container into an inlet chamber and an outlet chamber, and a plurality of filter elements, preferably shaped as rods or tubes, which are located in the inlet chamber and carried by the partition. The invention relates particularly to cleaning a liquid filter of the type mentioned, in which the filter elements are covered during the filtering process by a layer of powdered material which assists filtering, such as kieselguhr.

It is already known that a filter of the type mentioned above can be cleaned by return flushing, the filter deposits being rinsed off the filter elements. Return flushing requires a relatively large volume of liquid and takes rather a long time. It is also known that a filter of the type mentioned can be cleaned by allowing a small volume of liquid pass from the outlet chamber to the inlet chamber through the filter elements under high pressure difference. The filter elements are thus subjected to a "pressure shock" which causes the filter deposits to become detached. The high pressure difference is usually created by tapping off a certain amount of liquid from both the inlet and the outlet chambers and then rapidly releasing compressed air into the inlet chamber. This type of cleaning process is also fairly complicated and requires a certain volume of liquid.

The object of the invention is to effect a cleaning method which can be performed without releasing any liquid from the filter container. Another object of the invention is to effect a cleaning method which can be performed quickly and easily and which enables frequent cleaning of the filter, so that the filter can be cleaned as soon as the flow resistance in the filter deposits has noticeably increased.

The method according to the invention is characterized in that an air-pocket is arranged in the inlet chamber, that 11 inlets to and outlets from the container are closed, that compressed air is blown briefly into the outlet chamber so that liquid flows temporarily from the outlet chamber to the inlet chamber through the filter elements, and also so that the increased volume of liquid in the inlet chamber compresses the air-pocket, and that immediately thereafter the air blown in is released from the outlet chamber so that the air-popcket in the inlet chamber expands and creates a temporary flow of liquid from the inlet chamber to the outlet chamber, this latter liquid flow breaking up the filter deposits removed from the filter elements.

For blowing air into the outlet chamber it has been found advisable to use pressurized air having a pressure of about 6 kg/cm$^2$, to blow the pressurized air into the outlet chamber for a period of about 0.1 sec. and to let the air out of the outlet chamber for a period of about 0.2 sec. The air should be released from the outlet chambeer immediately after blowing in of the compressed air has been completed. This should be interpreted to mean that there may be a brief moment between completion of the blowing in process and initiation of the release process, for example a moment lasting about 0.5 sec. The duration of this period must be determined from case to case and depends on the inertia of the mass of liquid which is to pass through the filter elements. A large apparatus may therefore require more time.

The invention also relates to apparatus for performing the method. Such apparatus comprises a container, a partition to divide the container into an inlet chamber and an outlet chamber, and a plurality of filter elements, preferably rod shaped, which are located in the inlet chamber and carried by the partition 5, and is characterized in that the inlet chamber contains members to produce an air-pocket which is compressed upon a pressure increase in the liquid in the inlet chamber, and that all inlets to and outlets from the container are provided with closing valves, that the outlet chamber is provided with a supply conduit for pressurized air and with an outlet conduit for air supplied. According to a preferred embodiment the members for producing an air-pocket comprise at least one vertical tube, closed at the top and open at the bottom. These tubes may be placed between the filter elements, but they may alternatively be placed at the inner wall of the container. In the latter case, the tubes may be attached to the inner wall of the container, and their upper ends may then function as supports for the partition carrying the filter elements. It is preferably for the lower, open ends of the tubes to be located at a lower level than the lower part of the filter elements.

In the following the invention will be further described with reference to the accompanying drawing showing a filter plant which can be cleaned using the method according to the invention. The apparatus illustrated comprises a vertical, cylindrical container 1 having an upper part 1a and a lower part 1b. A horizontal partition 5 divides the container into an inlet chamber 2 and an outlet chamber 3. The partition 5 carries a plurality of rod-shaped or tubular filter elements 4 which have a conventional porous surface, for example consisting of metal wire netting or filter cloth. Liquid can be supplied to the inlet chamber 2 through three tubes, i.e., a tube 6 having a downwardly directed mouth, a tube 7 having an upwardly directed mouth and a tube 8 having a horizontally directed mouth. These tubes 6 – 8 are in communication, via a conduit 9 with a pump 10, with a tank 11 for liquid which is to be filtered.

A plurality of vertical tubes 12 are attached to the inside of the container wall 1, these tubes being closed at the top and open at the bottom. The upper part of the tubes serves as support for the partition 5.

The outlet chamber 3 is in communication with a supply conduit 13 for compressed air. The conduit 13 is provided with a magnetic valve 14. The outlet chamber 3 is also provided with an outlet conduit 15 having a magnetic valve 16. A conduit 17 provided with a magnetic valve 18 extends from the conduit 15 to a container 19 containing a suspension of material assisting filtration, in a liquid. A conduit 20 having a magnetic valve 21 extends from the bottom of the container 19 to the previously mentioned conduit 9.

A conduit 22 with a valve 23 extends from the lower part of the filter container 1 to the conduit 17.

The magnetic valves 14 and 18 are arranged to be controlled by a timer 26 in a manner which will be described below. The other magnetic valves shown may also be arranged to be controlled by a timer so that the process described in the following can be performed automatically.

When the apparatus is to be used, liquid containing the filtration-promoting material is pumped by the pump 10 from the container 19 to the filter container 1 and back to the container 19 through the conduits 15 and 17. This is allowed to continue long enough for a layer 24 of filtration-promoter having the desired thickness to be deposited on the filter elements 4.

The valves 18 and 21 are then closed and the valve 16 and a valve 27 in the conduit 9 are opened, whereupon liquid is pumped from the tank 11 to the inlet chamber 2 of the filter, preferably through the tube 8. The liquid is filtered as it passes through the filter elements and the filtered liquid leaves through the outlet chamber 3 and conduit 15. During the filtering process the whole filter container 1 is filled with liquid with the exception of the tubes 12 in which the liquid is at the level indicated by 28. Filtration continues until the flow resistance in the filter deposite has become unacceptably high. The filter deposit thus consists of the layer 24 of filtration-promoter and a layer 25 deposited on this of material filtered from the liquid.

The valves 16 and 27 are then closed so that no liquid can penetrate out of the filter. The timer 26 is then started, which opens the magnetic valve 14 for an instant so that compressed air penetrates into the outlet chamber 3, forming an air-pocket 30 there. The liquid thus displaced penetrates through the filter elements 4 out into the inlet chamber 2 and a corresponding volume of liquid enters the tubes 12 so that the surface of the liquid in these rises to 29, thus forming a pocket 31 of compressed air in the upper part of the tubes. The liquid passes through the filter elements with considerable force "internal shocking", resulting in the filter deposit 24, 25 being completely or partially removed from the filter elements. Immediately, or almost immediately, after the timer 26 has closed the valve 14, the magnetic valve 18 opens for an instant. The air in the air-pocket 30 flows out through the conduit 17 and the air in the air-pocket 31 expands and forces liquid with considerable force through the filter elements up to the outlet chamber 3 which is again filled with liquid. The period during which the valve 18 is kept open is controlled so that no liquid flows out into the conduit 17. This rapid return of liquid from the inlet chamber 2 to the outlet chamber 3 results in a second "internal shock" which helps to detach the filter deposit more efficiently from the filter element and also breaks up those filter deposits which have already been detached from the filter elements.

The filter deposits have now been collected in the form of a powder or slurry at the bottom 1b of the filter container and consist partly of filtration-promoter and partly of filtered particles. If these particles have a higher sedimentation rate than the particles of the filtration-promoter, the filtration-promoter can again be applied on the filter elements in the following manner. The valves 18 and 21 are opened and liquid allowed into the inlet chamber 2 of the filter through the downwardly directed tube 6. The flow of liquid eddies up the particles in the bottom part 1b and the lighter particles of the filtration-promoter accompany the liquid upwards and are again deposited on the filter elements in the form of a layer 24, while the heavier particles of the material filtered from the liquid remain in the bottom part 1b. The valves 18 and 21 are then closed, the valves 16 and 27 opened and the filtering process is continued as described above, the liquid being preferably allowed into the inlet part 2 of the filter through the horizontal tube 8 to avoid disturbing the particles deposited in the bottom part 1b.

The filtering process is continued, interrupted by cleaning operations at suitable intervals until the lower part 1b is filled with material which has been filtered from the liquid. The filtering process is then discontinued, the valve 23 in the bottom of the filter container is opened and the filtered-off material is pressed out through the conduit 22 to the open container 19 from which it can easily be removed. At the same time, the filter elements 4 are preferably rinsed by pump liquid into the inlet chamber 2 through the upwardly facing tube 7. Alternatively, the filter slurry can be emptied from the filter container 1b by blowing it out through a conduit 32 to a sludge separator.

What is claimed is:

1. In a method of filtering solids from a liquid suspension thereof wherein the suspension flows under pressure into an inlet zone, then from said inlet zone through filter elements into an outlet zone causing said solids to be deposited on said filter elements while a filtrate passes into said outlet zone, then permitting said filtrate to flow from said outlet zone, the method of cleaning said filter elements to remove deposited solids which comprises:
    a. providing an air pocket confined in said inlet zone;
    b. stopping filtration by simultaneously stopping the flow of suspension to the inlet zone and the flow of filtrate from the outlet zone;
    c. briefly admitting compressed air under high pressure into the outlet zone to cause a momentary, intense reversal of flow of liquid through the filter element into the inlet zone, thereby simultaneously dislodging deposited solids from said filter elements, increasing the pressure of liquid in the inlet zone, and compressing the air in the aforementioned air pocket; and
    d. immediately thereafter rapidly releasing the pressure in the outlet zone to cause the compressed air in said air pocket to expand to its initial volume and cause a momentary, intense flow of liquid through the filter elements from the inlet zone to the outlet zone, thereby breaking up the deposits removed from the filter elements.

2. The method according to claim 1 wherein filtration by flow of suspension to the inlet zone and of filtrate from the outlet zone is resumed after release of air pressure in the outlet zone.

3. The method according to claim 2 wherein the process of blowing compressed air into the outlet zone and releasing air from the outlet zone is repeated several times before resumption of filtration.

4. The method according to claim 1 wherein the filter elements are covered during the filtering process by a layer of powdered material which assists filtering.

5. Apparatus for filtering a liquid comprising:
    a. a container, a partition to divide the container into an outlet chamber and an inlet chamber;
    b. a plurality of flow passages in said partition;
    c. filter elements in the inlet chamber secured to said partition at said flow passages;
    d. at least one vertical tube in the inlet chamber closed at the top and open at the bottom for providing a compressible air pocket in the presence of liquid in the inlet chamber;
    e. means connected to said inlet and outlet chambers for conducting liquids to and from said chambers;

f. conduit means connected to the outlet chamber for admitting compressed air to said outlet chamber; and g. valve means in each of said conduits for controlling flow of liquids or air therein.

6. Apparatus according to claim 5 wherein the filter elements are tube-shaped.

7. Apparatus according to claim 5 wherein a plurality of open bottom, vertical tubes are attached to the inner wall of the container and their closed upper ends function as supports for the partition, said open bottom, vertical tubes comprising the air pockets.

8. Apparatus according to claim 5 wherein the lower, open ends of the vertical tubes are located below the level of the lowermost part of the filter elements.

9. A method for filtering liquid suspensions of solid material which comprises:
  a. providing an inlet zone for liquid suspension to be filtered, an outlet zone for filtrate, and a filtering zone for removing suspended solid materials connecting said inlet and outlet zones;
  b. providing a compressible air pocket within said inlet zones;
  c. continuously admitting liquid suspension under pressure to said inlet zone to force liquid through the filtering zone, whereby suspended solid material is retained in said filtering zone, and filtrate continuously passes into and is removed from said outlet zone, the liquid pressure in said inlet zone being sufficient to partially compress the air in the air pocket;
  d. continuing the filtration of step (c) until buildup of solid material in the filtering zone begins to impede flow of liquid through said filtering zone, and
  e. cleaning said filtering zone by
    i. shutting off the flow of suspension to the inlet zone,
    ii. shutting off the flow of filtrate from the outlet zone,
    iii. briefly admitting compressed air under high pressure into the outlet zone to cause a momentary, intense reversal of flow of filtrate from the outlet zone through the filtering zone, thereby dislodging deposited solid material from the filtering zone and further compressing the air in the air pocket in the inlet zone, and
    iv. immediately thereafter rapidly releasing the air pressure in said outlet zone causing the compressed air pocket in said inlet zone to expand, causing further removal of deposited solids from the filtering zone and breaking up agglomerates of removed solid material.

10. A method according to claim 9 wherein a suspension of a filtering aid is passed through the filtering zone to deposit a body of said filtering aid in said filtering zone prior to admission of the suspension to be filtered.

11. A method according to claim 9 wherein filtration is resumed after cleaning of the filtering zone.

12. A method according to claim 9 wherein the cleaning step is performed a plurality of times in succession prior to resumption of filtration.

* * * * *